(12) United States Patent
Regensburger et al.

(10) Patent No.: US 11,248,642 B2
(45) Date of Patent: Feb. 15, 2022

(54) CONNECTOR, SYSTEM CONSISTING OF A CONNECTOR AND A LATCHING PIN OF A SECOND COMPONENT, SAID LATCHING PIN HAVING A HEAD, AND METHOD FOR USING SUCH A SYSTEM

(71) Applicant: A. RAYMOND ET CIE, Grenoble (FR)

(72) Inventors: Jan Regensburger, Kandern (DE); Mathias Schwenk, Teningen (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 16/630,776

(22) PCT Filed: Jul. 11, 2018

(86) PCT No.: PCT/EP2018/068776
§ 371 (c)(1),
(2) Date: Jan. 13, 2020

(87) PCT Pub. No.: WO2019/011978
PCT Pub. Date: Jan. 17, 2019

(65) Prior Publication Data
US 2020/0158154 A1 May 21, 2020

(30) Foreign Application Priority Data
Jul. 14, 2017 (DE) .......................... 102017006675.2

(51) Int. Cl.
*F16B 21/06* (2006.01)
*F16L 3/12* (2006.01)

(52) U.S. Cl.
CPC ............... *F16B 21/065* (2013.01); *F16L 3/12* (2013.01)

(58) Field of Classification Search
CPC .... F16B 21/065; F16B 21/073; F16B 21/186; F16B 5/0642; F16B 5/065; F16B 5/0692; F16L 3/00; F16L 3/12
See application file for complete search history.

(56) References Cited

U.S. PATENT DOCUMENTS 5,542,716 A * 8/1996 Szabo ................... F16L 37/144
285/305
5,691,878 A 11/1997 Ahn et al.
(Continued)

FOREIGN PATENT DOCUMENTS

DE 69004890 T2 3/1994
DE 102006061703 A1 7/2008
(Continued)

OTHER PUBLICATIONS

International Search Report for PCT/EP2018/068776 dated Nov. 12, 2018, 3 pages.
(Continued)

*Primary Examiner* — David M Upchurch
(74) *Attorney, Agent, or Firm* — Warner Norcross + Judd LLP (57) ABSTRACT

A connector for connecting a first component to a locking pin of a second component having a head is disclosed. The connector has a base body with a receiving space for receiving the head. A retaining spring is held by the base body is provided, which has a relative position, referred to as the holding position, relative to the base body and which has a protrusion in this holding position protruding into the receiving space. The protrusion in the holding position can be moved in a release direction and projects less far into the receiving space after moving from the holding position in the release direction than in the holding position. Moving the protrusion from the holding position in the releasing direction tensions the retaining spring. When the retaining spring (Continued)

is in the holding position, the base body can be moved relative to the retaining spring along a locking direction.

19 Claims, 8 Drawing Sheets

(56) References Cited

U.S. PATENT DOCUMENTS

| | | | |
|---|---|---|---|
| 5,777,779 A | 7/1998 | Hashimoto et al. | |
| 8,973,952 B2* | 3/2015 | Nishino | F16L 37/1225 |
| | | | 285/319 |
| 10,047,889 B2* | 8/2018 | Chaupin | F16L 37/144 |
| 10,816,121 B2* | 10/2020 | Kerin, Jr. | F16L 37/0987 |
| 2005/0087981 A1* | 4/2005 | Yamada | F16L 37/0982 |
| | | | 285/81 |
| 2006/0082145 A1* | 4/2006 | Steveley | F16L 37/144 |
| | | | 285/305 |
| 2008/0048442 A1* | 2/2008 | Kerin | F16L 37/0885 |
| | | | 285/305 |
| 2008/0111371 A1 | 5/2008 | Feger et al. | |
| 2008/0284165 A1 | 11/2008 | Chiang | |
| 2010/0052315 A1* | 3/2010 | Kerin | F16L 37/144 |
| | | | 285/148.21 |
| 2010/0276924 A1* | 11/2010 | Gillet | F16L 37/144 |
| | | | 285/93 |
| 2011/0127766 A1* | 6/2011 | Tsurumi | F16L 37/144 |
| | | | 285/305 |
| 2013/0147187 A1* | 6/2013 | Yamada | F16L 37/144 |
| | | | 285/319 |
| 2013/0154255 A1* | 6/2013 | Daimon | F16L 37/12 |
| | | | 285/81 |
| 2014/0312614 A1* | 10/2014 | Barthel | F16L 37/1225 |
| | | | 285/319 |
| 2014/0319820 A1* | 10/2014 | Takimoto | F16L 37/144 |
| | | | 285/148.21 |
| 2015/0033632 A1 | 2/2015 | Huelsebusch et al. | |
| 2016/0238058 A1 | 8/2016 | Sbongk | |

FOREIGN PATENT DOCUMENTS

| | | |
|---|---|---|
| DE | 102014103535 A1 | 4/2015 |
| EP | 1813826 A1 | 8/2007 |
| EP | 1740876 B1 | 7/2010 |
| WO | 2013064255 A1 | 5/2013 |

OTHER PUBLICATIONS

Machine assisted English translation of DE69004890T2 obtained from https://worldwide.espacenet.com on Jan. 9, 2020, 14 pages.
Machine assisted English translation of DE102006061703A1 obtained from https://patents.google.com on Jan. 9, 2020, 6 pages.
Machine assisted English translation of EP1813826A1 obtained from https://patents.google.com on Jan. 9, 2020, 10 pages.

* cited by examiner

CONNECTOR, SYSTEM CONSISTING OF A CONNECTOR AND A LATCHING PIN OF A SECOND COMPONENT, SAID LATCHING PIN HAVING A HEAD, AND METHOD FOR USING SUCH A SYSTEM

CROSS-REFERENCE TO RELATED APPLICATIONS

This application is the National Stage of International Application No. PCT/EP2018/068776, filed on 11 Jul. 2018, which claims priority to and all advantages of German Patent Application No. 102017006675.2, filed on 14 Jul. 2017, the content of which is hereby incorporated by reference.

FIELD OF THE INVENTION

The disclosure relates to a connector for connecting a first component to a locking pin of a second component having a head. The disclosure also relates to a system comprising a connector and a locking pin of a second component having a head. The disclosure also relates to a method using such a system.

BACKGROUND OF THE INVENTION

US 2008 284 165 (A1) discloses a coupling which can movably connect the spherical ends of two channels for fluids. For this purpose, a cylindrical base body has a likewise cylindrical receiving space in which the spherical ends can engage. Both the locking and the holding force can be adjusted on both sides of the base body by means of likewise cylindrical inserts with a thread. The disadvantage of this coupling is that the holding force is adjusted statically and manually and if the required tightness or stability of the connection is high, a high permanent holding force is typically required, which, among other things, reduces the movability. Furthermore, assembly is relatively complex.

EP 1 740 876 B1 discloses a coupling for a fluid line system which has a coupling element where an insertion element of a counterpart can be inserted. Furthermore, the coupling has a C-shaped locking part which is attached to the coupling part around the longitudinal axis of the coupling. Locking in a locking position is achieved by means of circular and/or conical sections at the respective end of the locking part, which locks the locking part to a basic body of the coupling element. A complementary structure is formed on the insertion element of the counterpart in the form of an annular, flat surface for locking the insertion element with the insertion element, for which purpose the insertion element also has an annular, flat surface. During rotation around the longitudinal axis, the coupling and the circular segments slide out of the recesses when the locking part is bent open and the insertion element is released.

Against this background, the present disclosure was based on the object of proposing an improved connector for connecting a first component to a locking pin of a second component having a head, which in particular enables improved holding forces and/or improved holding and/or locking against unintentional releasing of the connection.

SUMMARY OF THE INVENTION

This object is accomplished by the connector, the system, and/or the method of this disclosure.

This disclosure is based on the fundamental idea of allowing, in the case of a connector comprising a base body with a receiving space to accommodate the head and a retaining spring held by the base body which projects into the receiving space, relative movement between the retaining spring and the base body from the holding position, where, in particular, generally a release of the retaining spring is possible, towards a locking position and to bring with this movement parts of the base body and parts of the retaining spring into such a relative position that a release of the retaining spring, in particular a splaying of the retaining spring, is blocked. This disclosure makes use of the knowledge that good retention of the locking pin is particularly necessary when force is applied to the base body which pulls the base body away from the locking pin. Here, the disclosure has recognized that this force can be used to bring about a relative movement between the retaining spring and the base body, which blocks the release of the retaining spring.

The connector according to the disclosure is provided for connecting a first component to a locking pin of a second component having a head. The connector may be a single component and may have, in addition to the option provided by the receiving space and the retaining spring for connecting it to the second component, connecting elements for connecting the connector to the first component, such as hooks, eyes, parts of a locking or Velcro connection. It is also conceivable that the connector itself may in turn have a locking pin with a head to which the first element is attached. The connector may also be a one-piece part of the first element and may, for example, be integrally molded with the first element, for example by making the base body of the connector a part of a larger injection molded part. The connector may also have surfaces to which the first component may be fastened by joining processes, in particular by welding, soldering or by adhesive bonding.

The connector according to the disclosure has a base body. The base body provides the receiving space to accommodate the head. In order to enable the head to be inserted into the receiving space, the base body generally has an opening where the head of the locking pin can be pushed into the receiving space from outside. The direction in which the head can be pushed into the receiving space from outside is understood as being the insertion direction. In the case of an opening provided in the base body through which the head of the locking pin can be inserted into the receiving space from the outside, the insertion direction is the direction perpendicular to the surface of the opening, wherein the surface of the opening is understood to be the surface bounded by the edges delimiting the opening. The insertion direction can also be understood as the direction connecting the center of the opening with the center of the receiving space, especially if the area of the opening cannot be clearly determined for complex openings. As an alternative to the provision of such an opening, embodiments that provide an insertion channel whose base forms the receiving space and through which the head can be pushed laterally into the receiving space from the outside are conceivable.

The base body also serves to hold the retaining spring. For this purpose it can, for example, have supporting surfaces which support parts of the retaining spring. In this case, the retention of the retaining spring by the basic body is designed in such a way that the retaining spring can assume a first position, referred to below as the holding position, and the basic body, when the retaining spring is in the holding position, can be moved relative to the retaining spring along a locking direction, wherein the retaining spring is moved from the holding position into a relative position relative to the basic body, referred to below as the locking position, when the basic body is moved in the locking direction.

In certain embodiments, the insertion direction is not perpendicular to the locking direction. In particular, the insertion direction can run at an angle of 0° to <90°, optionally from 0° to <60°, or optionally from 0° to <30° to the locking direction. In particular embodiments, the insertion direction is in the direction of the locking direction.

In certain embodiments, the release direction is not in the direction of the locking direction. In particular, the release direction can run at an angle of >0° to 90°, optionally >30° to 90°, or optionally >60° to 90° to the locking direction. In particular embodiments, the release direction is perpendicular to the locking direction.

In certain embodiments, the release direction is not in the direction of the insertion direction. In particular, the release direction can run at an angle of >0° to 90°, optionally >30° to 90°, or optionally >60° to 90° to the insertion direction. In particular embodiments, the release direction is perpendicular to the insertion direction.

In addition to providing the receiving space and access for the head to the receiving space and the holder of the retaining spring, the basic body may be designed as desired. It will often have contact surfaces which make it easier for the user to hold the base body and to put it on or push it onto the locking pin. In various embodiments, the base body is cube-shaped, spherical, ellipsoidal or a polyhedron.

The receiving space can be cylindrical or conical or have a structure which is complementary to the locking pin or its head. The receiving space may be cube-shaped, spherical, ellipsoidal or a polyhedron. However, other geometric or free-formed shapes may also be used. The receiving space of the basic body does not necessarily have to be designed to complement the locking pin. The base body may be made of plastic, metal or a composite material.

A retaining spring is understood to be an element of the connector which is held by the base body and can be moved out of a preferred position by tensioning the element. The retaining spring can prevent the connector from being released from the locking pin. The retaining spring may at least partially surround the base body. The retaining spring may be clamp-like. The retaining spring may also be arranged entirely within the base body. The retaining spring has the shape of an angular or round ring, which is generally interrupted at one or even several points. In certain embodiments, the retaining spring has a C-shaped design, especially with regard to the cross-section. A complex-shaped ring with one or more recesses and interruptions is also conceivable. The retaining spring can be an element which has a protrusion that can engage behind a recess of the locking pin. The retaining spring can also be an element which has a protuberance which engages behind a recess of the base body. The retaining spring can be made of an elastic material, in particular plastic or metal, or a composite material.

A holding position is understood—to distinguish it from the locking position, to be a first relative position of the retaining spring relative to the base body, where a protrusion of the retaining spring projects into the receiving space. The holding position differs from the locking position in particular in that in the holding position the protrusion can be moved into a release direction and after moving into the release direction from the holding position, it projects less far into the receiving space than in the holding position. Moving the protrusion from the holding position into the release direction spans the retaining spring. Since in the holding position the protrusion projects into the receiving space, the holding position is generally suitable for enabling the head to be held in the receiving space, that is, when the protrusion projecting into the receiving space engages behind the head on the side in the direction of which the head would have to be moved to get out of the receiving space.

The locking position refers to the relative position of the retaining spring relative to the base body, where the retaining spring is moved from the retaining position into a locking direction when the base body is moved.

According to the disclosure, it is now provided that the base body has an internal contact point or an internal contact surface and the retaining spring has a mating surface, wherein the internal contact point or the internal contact surface in the locking position is in contact with the mating surface of the retaining spring or the internal contact point or the internal contact surface in the locking position comes into contact with the mating surface of the retaining spring when the protrusion in the locking position is moved in the release direction. Alternatively, it is provided that the retaining spring has an external contact point or an external contact surface and the base body has a mating surface, wherein the external contact point or external contact surface in the locking position is in contact with the mating surface of the base body or the external contact point or external contact surface in the locking position comes into contact with the mating surface of the base body when the protrusion in the locking position is moved in the release direction. The contact of the contact point or contact surface with the mating surface prevents the protrusion from moving further in the release direction, and thus prevents the retaining spring from being released. This enables the disclosure to ensure that whenever a force acts on the base body that moves the base body into the locking position when the retaining spring is in the retaining position, the head is held particularly securely in the receiving space and, in particular, the retaining spring is not released unintentionally.

The disclosure has recognized that the interaction of two surfaces is suitable for a blockade, for example, an internal contact surface on the base body with a mating surface on the retaining spring or an external contact surface on the retaining spring with a mating surface on the base body. However, the disclosure has also recognized that a blockade can already be achieved by the interaction of a contact point with a mating surface. The contact point may be the tip of a protrusion. The contact point may be on an edge. The contact point may be on a rib. For example, an interaction of an internal contact point on the base body with a mating surface on the retaining spring or an external contact point on the retaining spring with a mating surface on the base body may be provided.

In certain embodiments, the contact point or contact surface in the holding position is in contact with the mating surface, which is at an angle to the locking direction in these embodiments, and the contact point in contact with the mating surface or the contact surface in contact with the mating surface slides along the mating surface when the base body is moved towards the locking direction. This sliding can be used to push the protrusion of the retaining spring further into the receiving space or to compress the material forming the projection, and thus increasing the contact pressure of the protrusion against the head. In certain embodiments, the mating surface is at an angle of >5°, >10°, >20°, >30°, >40°, >45°, >50°, >60°, or >70°, to the locking direction.

In certain embodiments, the contact point, or contact surface, is arranged at a distance from the mating surface, which is at an angle to the locking direction in these embodiments, but comes into contact with the mating surface when the main body is moved in the locking direction with the retaining spring in the holding position. The contact point in contact with the mating surface, or the contact surface in contact with the mating surface, slides along the mating surface when the base body is moved towards the locking direction. This sliding can be used to push the protrusion of the retaining spring further into the receiving space or to compress the material forming the projection, and thus increasing the contact pressure of the protrusion against the head. In certain embodiments, the mating surface is at an angle of >5°, >10°, >20°, >30°, >40°, >45°, >50°, >60°, or >70°, to the locking direction.

In further embodiments, the retaining spring has a second protrusion which protrudes into the receiving space in the holding position and which is arranged opposite the first protrusion. More than two protrusions are also conceivable, which are arranged in particular on a ring around the longitudinal axis, generally at equidistant angles. The protrusions may protrude into the receiving space through separate recesses in the base body and may, in particular, have different geometries which generally have different holding characteristics. It is not necessarily required that all protrusions move out of the receiving space when the locking pin is inserted into the receiving space. It is conceivable that different holding, locking and latching characteristics may be distributed. In particular, the protrusions can be moved out of the receiving space, generally essentially simultaneously, by spreading the retaining spring.

In further embodiments, the second protrusion and the first protrusion may be moved away from each other, generally by spreading the retaining spring.

In further embodiments, the protrusion passes through a window provided in the base body. The window may take the form of a recess which represents a lateral opening into the receiving space of the connector from the outside. The window may have a rectangular, but also a round or free-formed cross-sectional shape. The connector can have an assigned window for each protrusion of the retaining spring. It is also conceivable to have larger windows which can accommodate more than one protrusion. In particular, the edges of the window may be rounded or have inclined surfaces which may affect the holding force and/or the locking function. The size of the window is typically dimensioned in such a way that the free space or freedom of movement of the retaining spring is only limited to an essentially necessary extent. In particular, the size of the window is such that the retaining spring is prevented from falling out of the base body.

In certain embodiments, the protrusion has a concave surface section facing the interior of the receiving space, or a planar surface section facing the interior of the receiving space and extending at an angle of >0° and <90°, optionally from >0° to <80°, or optionally from >0° and <70° to the locking direction. It is also conceivable to have convex surface sections on the protrusion, for example to reduce friction with the indexing pin and/or to increase the tightness, especially with sealants.

In certain embodiments, the surface section of the retaining spring facing the interior of the receiving space merges into a planar surface section via an edge, generally a surface section of the retaining spring running perpendicular to the locking direction. A surface section of the retaining spring extending perpendicular to the locking direction can be used as a stop surface which can be brought into contact with a stop surface of the base body in order to limit the movement of the retaining spring, for example to prevent the base body from being moved in the opposite direction to the locking direction when the retaining spring is in the holding position. In particular, the stop surface of the base body is formed by a surface which delimits a window in the base body where the protrusion of the retaining spring protrudes into the interior of the receiving space.

According to a further aspect of the disclosure, a connector is provided for connecting a first component to a locking pin of a second component having a head, which has a base body with a receiving space for receiving the head, wherein the base body has an opening connecting the base body to the receiving space, through which the head can be pushed into the base body from outside the base body along an insertion direction. Furthermore, the connector has a retaining spring held by the base body, which has a relative position, referred to as a holding position, relative to the base body and has a protrusion in this retaining position protruding into the receiving space. According to this further aspect of the disclosure, the protrusion has a concave surface section facing the interior of the receiving space or has a planar surface section facing the interior of the receiving space and extending at an angle of >0° and <90°, optionally from >0° to <80°, or optionally from >0° and <70° to the insertion direction.

In certain embodiments, the retaining spring has a guide surface which, when the retaining spring is in the holding position, is either in contact with a guide surface of the base body or comes into contact with a guide surface of the base body when the base body is moved in the locking direction when the retaining spring is in the holding position, wherein the guide surface of the retaining spring and/or the guide surface of the base body are in planes containing the locking direction or run parallel to the locking direction. The interaction of these guide surfaces allows the base body to move smoothly in the locking direction, even if the forces causing the movement of the base body relative to the retaining spring do not move perfectly in the locking direction.

In certain embodiments, the contact surface, or contact point of the retaining spring is provided on a pin formed on the retaining spring, which projects into a recess in the base body, generally a hole, in the locking position, and the recess is partially delimited by the mating surface. In particular, the pin of the retaining spring is generally located outside the recess in the retaining position, so that the pin is only inserted into the recess when the basic body moves in the locking direction.

In certain embodiments, the base body has a support surface which can be used to support it on the second component. In particular, the supporting surface may be part of a sealing lip or a sealing screen made of elastic material formed on the base body.

In certain embodiments, the protrusion has an inclined surface facing away from the receiving space in the direction of the opening where the head of the locking pin is pushed into the receiving space. If the head comes into contact with this inclined surface, it can push the protrusion slightly out of the receiving space in the release direction, and thus creating space for inserting the head into the receiving space.

In certain embodiments, the mating surface or the contact surface of the retaining spring is designed on a rib of the retaining spring, generally on a curved rib projecting from other parts of the retaining spring, and/or generally projecting in a direction opposite to the locking direction. The rib is, in particular embodiments, designed on the protrusion.

In certain embodiments, the mating surface or the contact surface of the retaining spring is designed in a groove of the retaining spring, generally in a curved groove, which is inserted into another part of the retaining spring, or generally in the direction of the locking direction. The rib is, in particular embodiments, inserted into the protrusion.

In certain embodiments, the mating surface or contact surface of the base body is designed on a rib of the base body, generally on a curved rib, which projects from other parts of the base body, and/or generally in one direction of the locking direction.

In certain embodiments, the mating or contact surface of the base body is designed in a groove of the base body, generally in a curved groove, which is inserted into another part of the base body, and/or generally in a direction opposite to the locking direction.

In certain embodiments, the basic body and/or the retaining spring are designed mirror-symmetrically, especially with regard to a plane parallel to the locking direction.

The system according to the disclosure comprises a connector according to the disclosure and a locking pin of a second component having a head.

In certain embodiments, the head of the locking pin is spherical. However, the head can also be rectangular, ellipsoidal or polyhedral.

The locking pin can be formed by the head itself without the locking pin having a web supporting the head. For example, the locking pin may be created by attaching a ball to a surface of the second component. In certain embodiments, the locking pin has a web supporting the head. In specific embodiments, the web is a ball and the head is a ball. However, the web can also be a cylinder or a rectangle. Embodiments where the head constitutes a thickening relative to a web are conceivable, for example, when a ball is placed on a cylindrical pin. Embodiments where the head and the web have the same width/thickness are also conceivable. The head is then the end of the web and is generally offset from the web by a recess, groove or pocket in the outer surface of the web where a protrusion of the retaining spring can engage.

In certain embodiments of the system, the locking pin has, when the head is in the receiving space of the connector, a surface section facing the protrusion, which is generally convex or, in particular, at an angle of >0° and <90° to the locking direction.

Furthermore, the disclosure includes a method for connecting a first component to a locking pin of a second component having a head, in particular to a previously designated system, wherein the head of the locking pin is moved into the receiving space of the connector.

The disclosure also includes the use of the connector according to the disclosure for connecting a holder, e.g. for connecting a hose to a frame part of an automobile or for connecting a carpet to a floor surface of an automobile or for connecting a panel, e.g. a part of a dashboard to a frame part of an automobile, or for fixing a rear shelf or trim parts, such as a door trim.

BRIEF DESCRIPTION OF THE DRAWINGS

The invention is described in greater detail below on the basis of two primary drawings illustrating the exemplary embodiments in more detail in the accompanying figures, in which.

DETAILED DESCRIPTION

Referring to FIGS. 1-8, wherein like numerals indicate corresponding parts throughout the several views, a connector is illustrated and generally designated 1. In particular, two embodiments of the connector 1 are shown in the figures, the connector 1 for fastening a first component (not shown in detail) to a second component have a base body 4 and a retaining spring 6. The connector also has a receiving space 5 with an opening 12 connecting the outside of the base body 4 with the receiving space 5, through which the head 2 of a locking pin 3 can be pushed into the base body 4 from outside the base body 4 and received by the receiving space 5.

Figure 1:
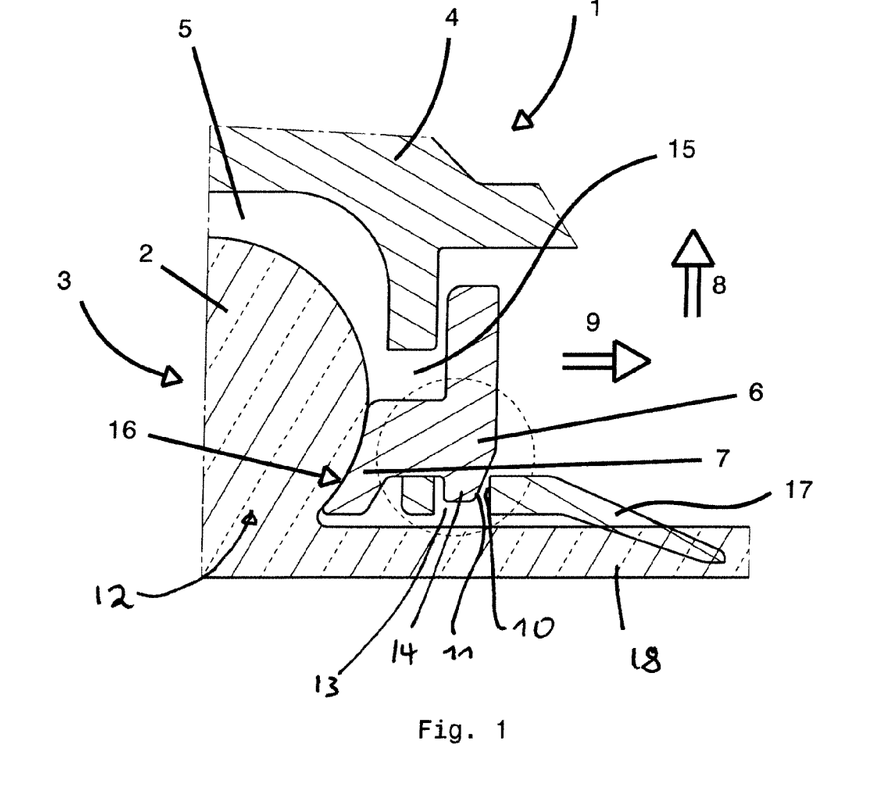
FIG. 1 shows a cross section of a first embodiment of a connecting system according to the disclosure having a base body, a retaining spring and a locking pin, wherein the base body is in the locking position.
Figure 2:
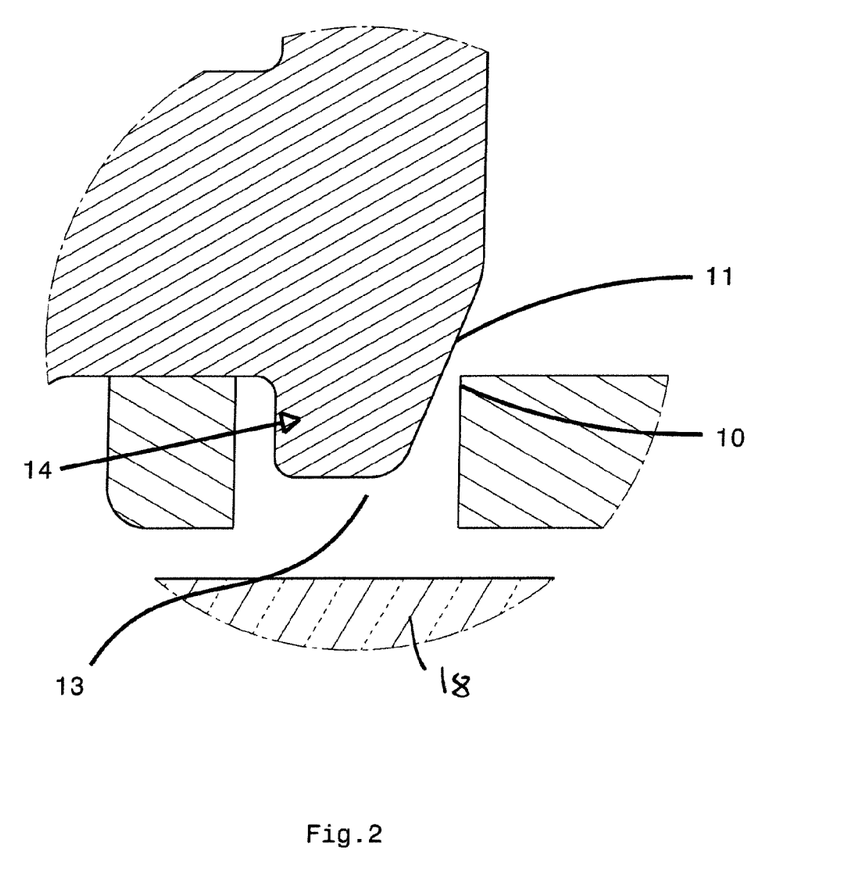
FIG. 2 shows the detail on a larger scale indicated by a dotted circle in FIG. 1.

FIG. 1 shows parts of a cross-section of a first embodiment of a connecting system according to the disclosure with the base body 4, the retaining spring 6 and the locking pin 3 in the locking position. The embodiment is constructed symmetrically with respect to the vertical longitudinal axis, so that the left half not shown in FIG. 1 corresponds to the right half shown. The locking pin 3 has already been inserted from below through an opening 12 of the base body 2 into the receiving space 5 and the base body 4 is brought into the locking position shown in FIG. 1 by moving it into the locking direction 8 with the retaining spring 6 in the holding position.

The retaining spring 6 held by the base body 4 has a relative position relative to the base body 4 (not shown in FIG. 1), referred to as the holding position. In this holding position, the retaining spring has a protrusion 7 protruding into the receiving space 5. In the holding position, the protrusion 7 can move into a release direction 9. After moving from the holding position into the release direction 9, the protrusion 7 protrudes less far into the receiving space 5 than in the holding position. Moving the protrusion 7 from the holding position into the release direction 9 tensions the retaining spring 6. Relative to the locking position shown in FIG. 1, the holding position results when the retaining spring 6 is moved in the direction of the arrow 8 relative to the base body 4 or the base body is moved relative to the retaining spring 6 counter to the locking direction 8.

The base body 4 has an internal contact surface 10 which delimits a recess 13. The retaining spring 6 has a mating surface 11 formed on a pin 14. In the locking position shown in FIG. 1 (cf. also FIG. 2) the internal contact surface 10 is shown at a distance from the mating surface 11 of the retaining spring 6 but comes into contact with the mating surface 11 of the retaining spring 6 starting from the locking position shown in FIG. 1 when the protrusion 7 is moved in the locking position in the release direction 9. The resulting contact prevents the protrusion 7 from being moved further in the release direction 9.

The base body 4 has a window 15 through which the protrusion 7 of the retaining spring 6 protrudes into the receiving space 5.

In the locking position shown in FIG. 1, a concave surface section 16 facing the inside of the receiving chamber 5 is in contact with the spherical head 2.

FIG. 1 also shows that a sealing lip 17 is provided on the base body 4. In the illustration in FIG. 1 the sealing lip is shown overlapping with the second component 18 in order to indicate that the sealing lip 17 is elastic and contacts the surface of the second component 18.

Figure 3:
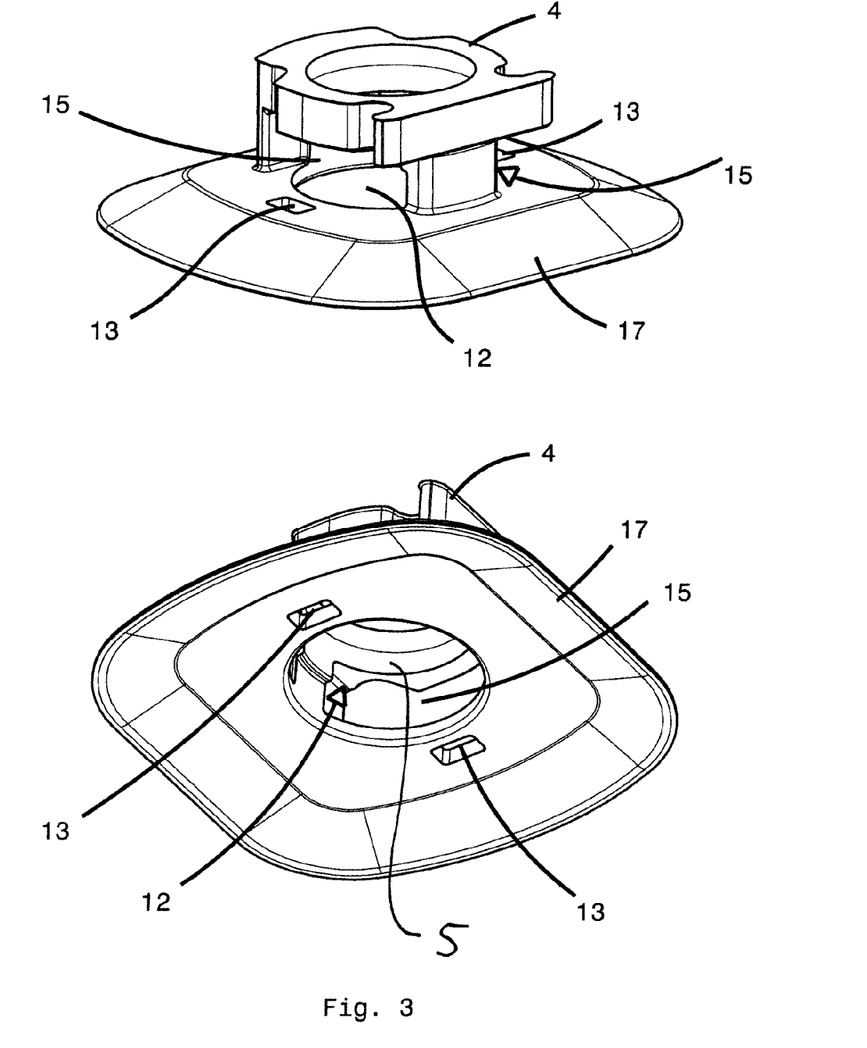
FIG. 3 shows obliquely upward or downward perspective views of a base body of the connector according to the disclosure according to FIG. 1.

FIG. 3 shows obliquely upward and downward perspective views of the base body 4 of the connector 1 according to FIG. 1. The obliquely downward view shows the cylindrical receiving space 5 and side windows 15 through which the retaining spring 6 can project into the receiving space 5. Furthermore, sealing surfaces 17 for supporting on a surface of the second component can be seen, which are arranged in a screen-like manner around the opening 12. The base body 4 also has two recesses 13 for engaging the pins 14 of the retaining spring 6.

Figure 4:
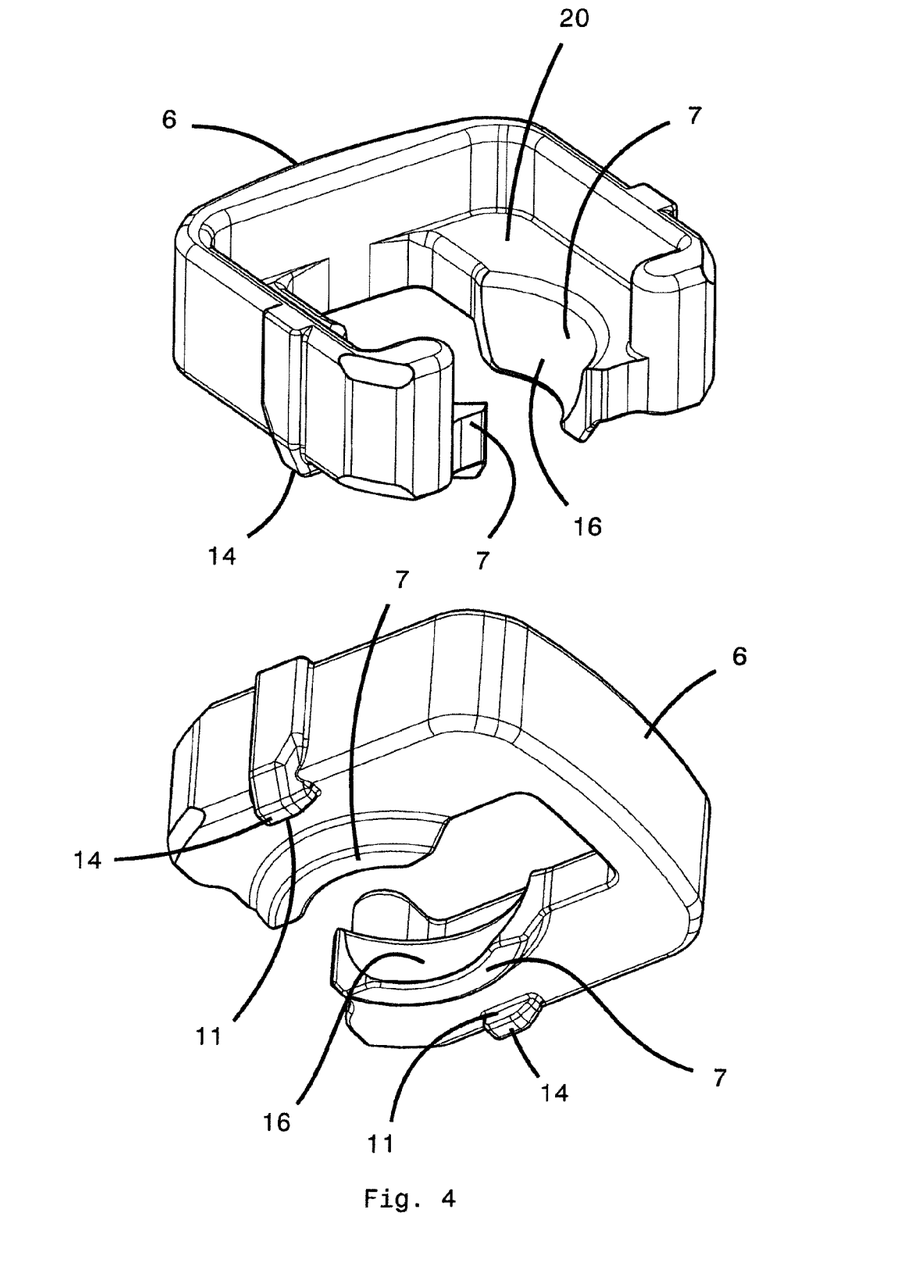
FIG. 4 shows obliquely upward or downward perspective views of a retaining spring of the connector according to the disclosure according to FIG. 1.

FIG. 4 shows obliquely upward and downward perspective views of a retaining spring 6 of the connector according to FIG. 1. The basic shape of an opened ring of the retaining spring 6 or the clamp-like structure can be seen. Furthermore, the mating surfaces 11 can be seen on the pins 14.

The retaining spring 6 has two protrudes 7 which are constructed mirror-symmetrically and have concave surface sections 16 for engagement with the spherical head 1. On the opposite side of the opening of the ring, the retaining spring has a reduced material thickness. This can result in increased elasticity or increased deformation. A relatively wide, frame-like design of the retaining spring 6 allows the connection to be easily mounted or dismounted or easily released from the locked position. The concave surface section 16 passes over an edge into a planar surface section 20 which can also serve as a stop and can define an end position of the retaining spring 6 within the base body 4 (comparable to position shown in the two left images and the position shown in the middle image of FIG. 5).

Figure 5:
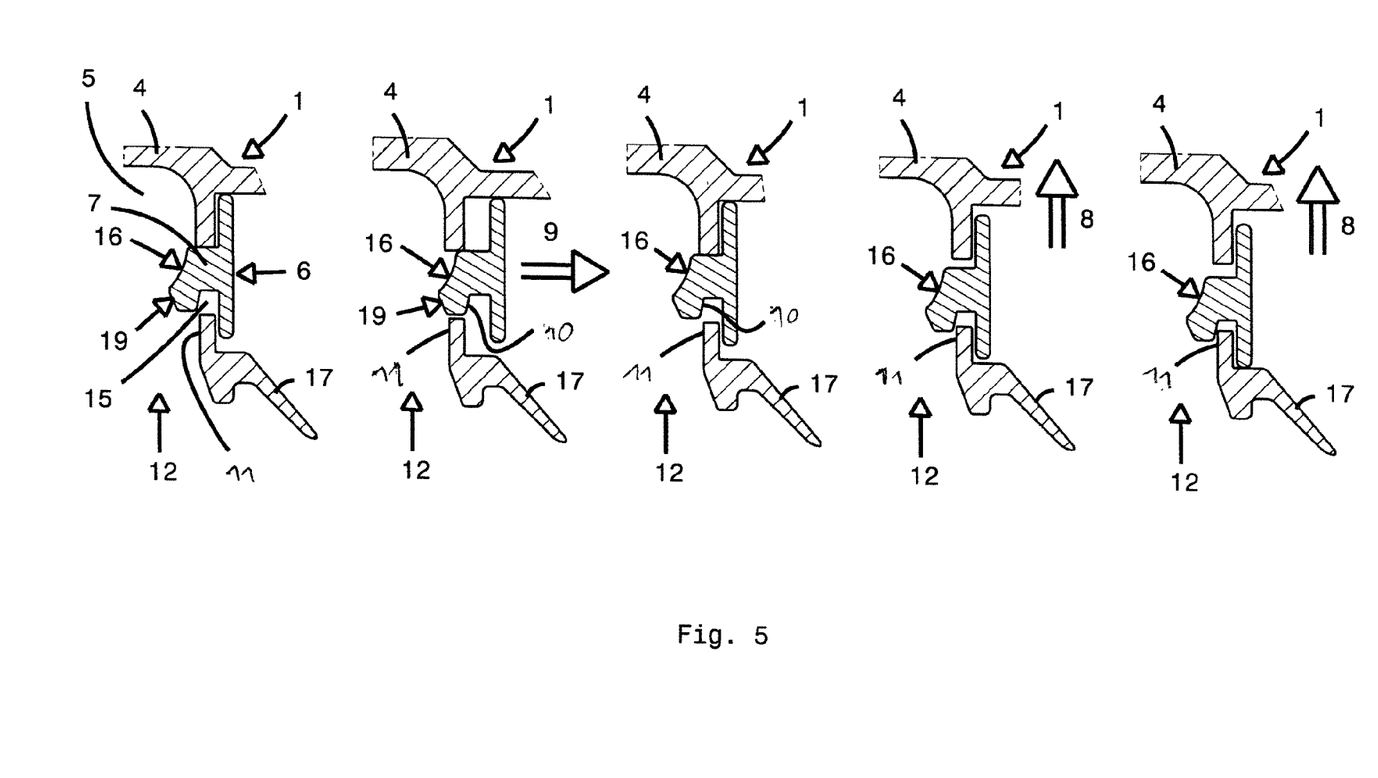
FIG. 5 shows a sequence of five cross-sections of a part of a further embodiment of a connector according to the disclosure, wherein the sequence of the cross-sections shows the sequence of the positions of the retaining spring relative to the base body when the locking pin is inserted and when the locking position is assumed.

FIG. 5 shows a sequence of parts of a cross-section of an embodiment of the connector 1 according to the disclosure. The locking pin 3 and the head 2 of the system according to the disclosure are not shown in the illustration for simplification. The embodiment according to FIG. 5 is also constructed symmetrically with respect to the vertical longitudinal axis, so that the left half not shown in FIG. 5 corresponds to the right half shown.

The far left image in FIG. 5 shows the connector with the retaining spring 6 in the holding position. In particular, it can be seen that the protrusion 7 protrudes through a window of the base body 4 into the receiving space 5. It can also be seen that the external contact surface 10 of the retaining spring 6 does not come into contact with the mating surface 11 of the base body 4 when the protrusion 7 is moved in the release direction 9. As can be seen in the second image on the left of FIG. 5, this allows the protrusion 7 to be moved in a direction outwardly of the receiving space 5. This movement is either necessary for releasing the retaining spring 6 or for pushing the head 2 of the locking pin 3 past the protrusion 7 from bottom to top. In order to facilitate this insertion of the head 2, the protrusion 7 has a bevel 19 pointing outwards. If the head 2 comes into contact with the bevel 19 during its movement from bottom to top into the receiving space 5, the head 2 attempts to push the protrusion 7 outwards as it continues to move. If the retaining spring is in the retaining position, as shown in the two images on the left and in the middle image in FIG. 5, this outward pushing is successful and the head 2 passes the protrusion 7 and reaches the receiving space 5. If the head 2 has passed the protrusion, the protrusion 7 springs back inward. This is because moving the protrusion 7 out of the receiving space 5 tensions the retaining spring 6. The spring-back of the protrusion 7 can be seen in comparison with the second image from the left with the middle image of FIG. 5.

In the two right images of FIG. 5 the base body 2 is moved in the locking direction 8 into the locking position (image in FIG. 5 on the far right). During the movement in the locking direction 8 the contact surface 10 comes into contact with the mating surface 11. This contact prevents the protrusion 7 from moving out of the receiving space 5.

Figure 6:
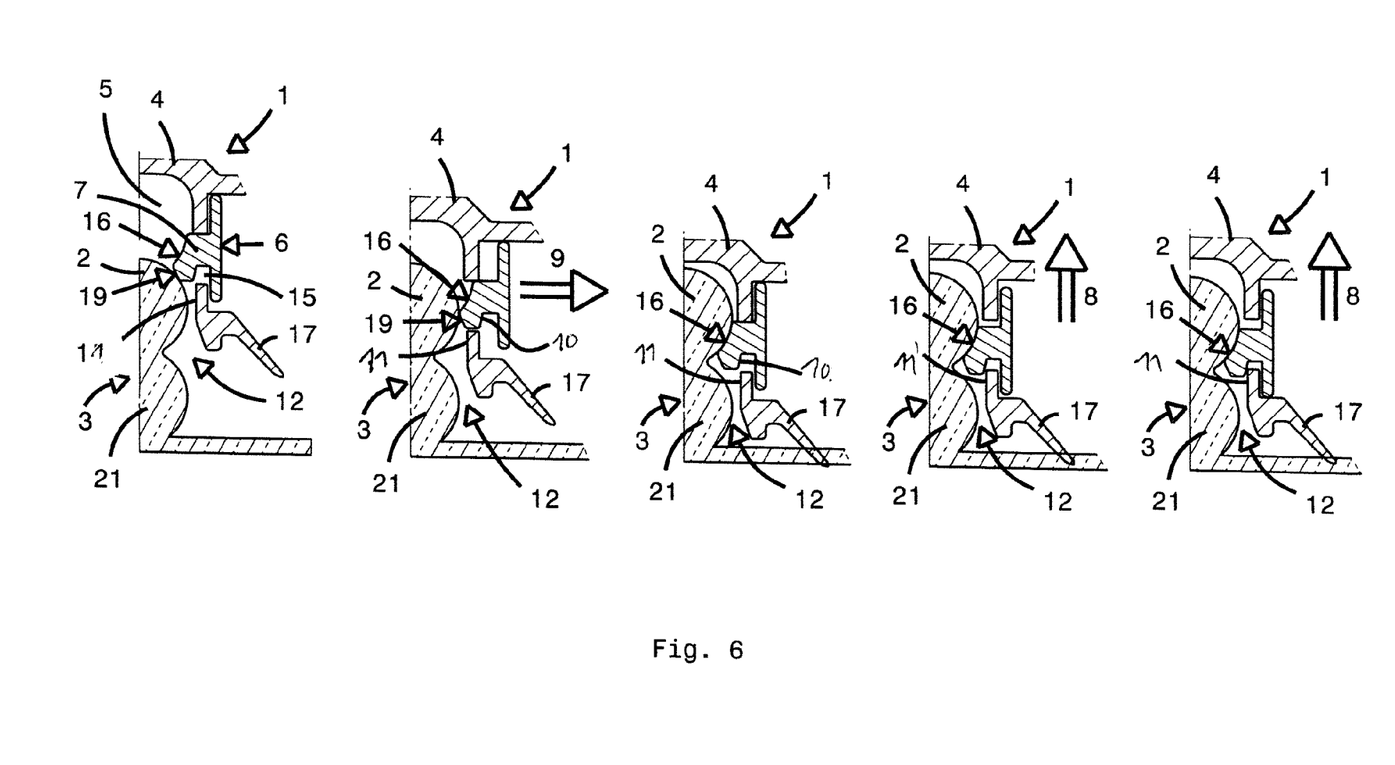
FIG. 6 shows the sequence of five cross-sections of a part of the further embodiment of the connector according to the disclosure according to FIG. 5 with the addition of the locking pin having a head, wherein the sequence of the cross-sections shows the sequence of the positions of the retaining spring relative to the base body when the locking pin is inserted and when the locking position is assumed.

FIG. 6 shows the sequence of images according to FIG. 5 with the addition of a locking pin 3 having a spherical head 2 and a spherical shaft 21.

Figure 7:
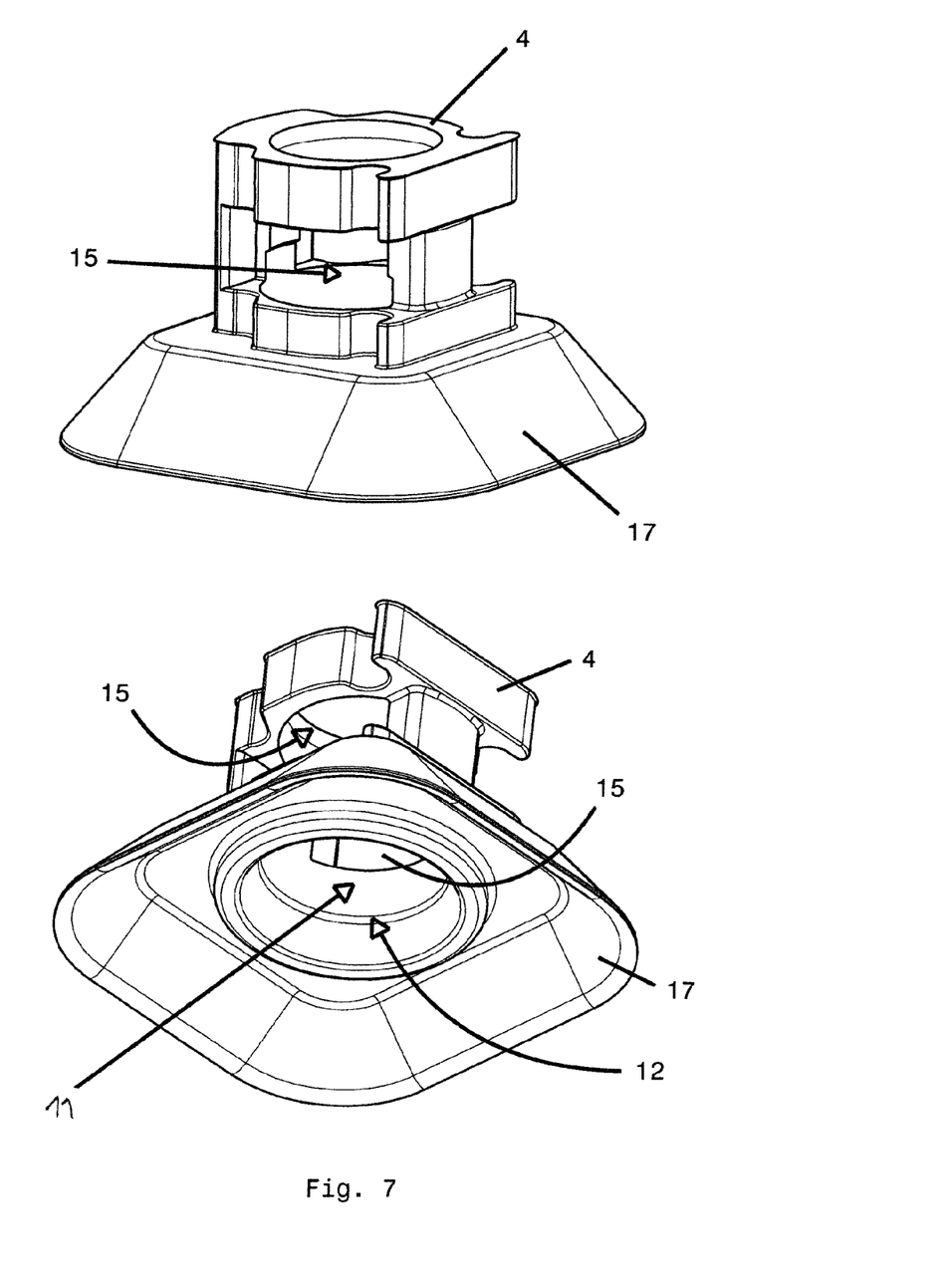
FIG. 7 shows obliquely upward or downward perspective views of a base body of the connector according to the disclosure according to FIGS. 5 and 6.
Figure 8:
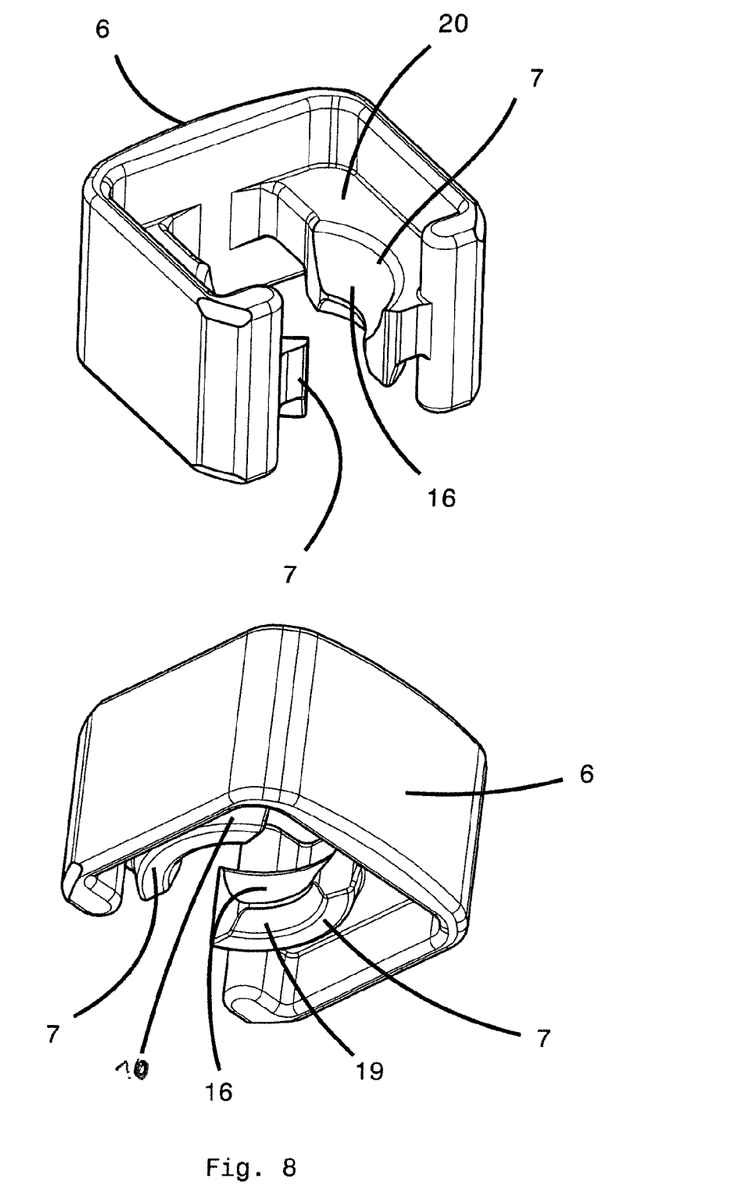
FIG. 8 shows obliquely upward or downward perspective views of a retaining spring of the connector according to the disclosure according to FIGS. 5 and 6.

FIG. 7 shows obliquely upward and downward perspective views of the base body 4 for the second embodiment according to FIGS. 5 and 6. The larger spacing surfaces and the windows 15 for the retaining spring 6, which are offset further up, can be clearly seen. Reinforcements in the area of the opening can also be seen on a ring FIG. 8 shows obliquely upward and downward perspective views of a retaining spring 6 in the second embodiment according to FIGS. 5 and 6. The frame-like basic structure of the opened ring is wider or thicker than in the first embodiment. Furthermore, the protrusions 7 have more distinct lower contact surfaces, which can facilitate the insertion of the locking pin 3 into the receiving region and are particularly complementary to the shape of the recess between the two spherical sections of the locking pin 3. This also allows a higher stability of the connector 1 in the holding position. Furthermore, the lower oblique surfaces 19 on the protrusions 7 facilitate spreading of the retaining spring 6, and the head 2 of the locking pin 3 is automatically centered. On the rear side of the retaining spring 6, a bead or circumferential groove is formed by the frame-like ring and the two protrusions 7 protruding downwards, in which a ring on the base body 4 can engage. This enables increased stability and improved guidance in the locking process.

The connector 1 or the base body 4 and/or the locking pin 3 are generally connected or attached to a component. In particular, this may be a flat element, for example a panel, a carpet, or a component made of plastic, metal or a composite material, which is attached to connector 1, for example with a frictional or positive fit. The component on the connector and the component on the locking pin 3 may have different materials which are difficult to overcome thermally or adhesively. It is also conceivable that the system could be used in the field of cable laying, where fast, secure and reversible cable support is required.

The terms "comprising" or "comprise" are used herein in their broadest sense to mean and encompass the notions of "including," "include," "consist(ing) essentially of," and "consist(ing) of. The use of "for example," "e.g.," "such as,"

and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A system for attaching a first component to a second component, the system comprising:
    a locking pin including an enclosed solid head, the locking pin being a portion of the second component; and
    a connector for connecting the first component to the locking pin of the second component, the connector comprising:
        a base body with a receiving space for receiving the head, and
        a retaining spring held by the base body and which has a relative position, referred to as the holding position, relative to the base body and which, in this holding position, has a protrusion protruding into the receiving space to extend at least partially around the head, wherein the protrusion in the holding position can be moved in a release direction and, after moving from the holding position in the release direction, projects less far into the receiving space than in the holding position, wherein moving the protrusion from the holding position in the release direction tensions the holding spring,
        wherein the base body, when the retaining spring is in the holding position, can be moved relative to the retaining spring along a locking direction, wherein the retaining spring is moved from the holding position to a relative position, referred to as the locking position, relative to the base body when the base body is moved into the locking direction, and
        wherein the base body has an internal contact point or an internal contact surface and the retaining spring has a mating surface, wherein the internal contact point or the inner contact surface in the locking position is in contact with the mating surface of the retaining spring, or the inner contact point and/or the inner contact surface in the locking position comes into contact with the mating surface of the retaining spring when the protrusion in the locking position is moved in the release direction.

2. The system according to claim 1, wherein the internal contact point, or the internal contact surface in the holding position is in contact with the mating surface of the holding spring, which is at an angle to the locking direction, or is spaced apart from the mating surface of the holding spring, but comes into contact with the mating surface of the holding spring when the base body is moved in the locking direction with the holding spring in the holding position and the contact point in contact with the mating surface of the retaining spring or the contact surface in contact with the mating surface of the retaining spring slides along the mating surface when the base body is moved in the direction of the locking direction.

3. The system according to claim 1, wherein the retaining spring has a second projection which, in the holding position, protrudes into the receiving space and which is arranged opposite the first protrusion.

4. The system according to claim 3, wherein the second protrusion and the first protrusion can be moved away from each other by spreading the retaining spring.

5. The system according to claim 1, wherein the protrusion passes through a window provided in the base body.

6. The system according to claim 1, wherein the protrusion has a concave surface section facing the interior of the receiving space or has a planar surface section facing the interior of the receiving space and extending at an angle of >0° and <90° to the locking direction.

7. The system according to claim 1 wherein the head is spherical, rectangular, ellipsoidal, or polyhedral.

8. The system according to claim 7, wherein the head is located in the receiving space of the connector, and the locking pin has a surface section facing the protrusion which is convex or which extends at an angle of >0° and <90° to the locking direction.

9. A method for connecting a first component to a locking pin of a second component having a head, the method comprising the system according to claim 7, wherein the head of the locking pin is moved into the receiving space of the connector.

10. A system for attaching a first component to a second component, the system comprising:
    a locking pin including an enclosed solid head, the locking pin being a portion of the second component; and
    a connector for connecting the first component to the locking pin of the second component, the connector comprising:

a base body with a receiving space for receiving the head, and a retaining spring held by the base body and which has a relative position, referred to as the holding position, relative to the base body and which, in this holding position, has a protrusion protruding into the receiving space to extend at least partially around the head, wherein the protrusion in the holding position can be moved in a release direction and, after moving from the holding position in the release direction, projects less far into the receiving space than in the holding position, wherein moving the protrusion from the holding position in the release direction tensions the holding spring, wherein the base body, when the retaining spring is in the holding position, can be moved relative to the retaining spring along a locking direction, wherein the retaining spring is moved from the holding position to a relative position, referred to as the locking position, relative to the base body when the base body is moved into the locking direction, and wherein the retaining spring has an external contact point or an external contact surface and the base body has a mating surface, wherein the external contact point or the external contact surface in the locking position is in contact with the mating surface of the base body or the external contact point or the external contact surface in the locking position comes into contact with the mating surface of the base body when the protrusion in the locking position is moved in the release direction.

11. The system according to claim 10, wherein the external contact surface, or the external contact point in the holding position is in contact with the mating surface of the base body, which is at an angle to the locking direction, or is arranged at a distance from the mating surface of the base body, but comes into contact with the mating surface of the base body when the base body is moved in the locking direction with the retaining spring in the holding position and the contact point in contact with the mating surface of the base body, or the contact surface in contact with the mating surface of the base body slides along the mating surface when the base body is moved in the direction of the locking direction.

12. The system according to claim 10, wherein the retaining spring has a second projection which, in the holding position, protrudes into the receiving space and which is arranged opposite the first protrusion, and optionally, wherein the second protrusion and the first protrusion can be moved away from each other by spreading the retaining spring.

13. The system according to claim 10, wherein the protrusion passes through a window provided in the base body.

14. The system according to claim 10, wherein the protrusion has a concave surface section facing the interior of the receiving space or has a planar surface section facing the interior of the receiving space and extending at an angle of >0° and <90° to the locking direction.

15. The system according to claim 10 wherein the head is located in the receiving space of the connector, and the locking pin has a surface section facing the protrusion which is convex or which extends at an angle of >0° and <90° to the locking direction.

16. A method for connecting a first component to a locking pin of a second component having a head, the method comprising the system according to claim 15, wherein the head of the locking pin is moved into the receiving space of the connector.

17. A method for connecting a first component to a locking pin of a second component having a head, the method comprising the system according to claim 10, wherein the head of the locking pin is moved into the receiving space of the connector.

18. A system for attaching a first component to a second component, the system comprising:
a locking pin including an enclosed solid head, the locking pin being a portion of the second component; and
a connector for connecting the first component to the locking pin of the second component, the connector comprising:
a base body with a receiving space for receiving the head, wherein the base body has an opening connecting the exterior of the base body to the receiving space, through which the head can be pushed into the base body from outside the base body along an insertion direction, and
a retaining spring held by the base body and which has a relative position, referred to as the holding position, relative to the base body and has a protrusion in this holding position protruding into the receiving space to extend at least partially around the enclosed solid head,
wherein the protrusion has a concave surface section facing the interior of the receiving space or has a planar surface section facing the interior of the receiving space and extending at an angle of >0° and <90° to the insertion direction.

19. The system according to claim 18 wherein the head is located in the receiving space of the connector, and the locking pin has a surface section facing the protrusion which is convex or which extends at an angle of >0° and <90° to the locking direction.

* * * * *